Figure 1:
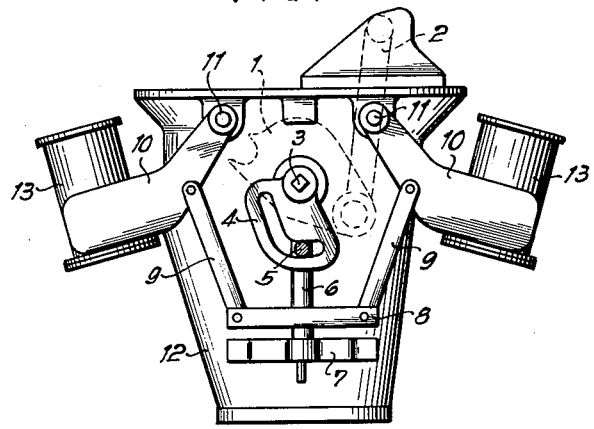

June 19, 1956    W. SCHARFENBERG    2,751,089
AUTOMATIC CABLE CONNECTING APPARATUS
FOR RAILROAD CARS AND THE LIKE
Filed Feb. 23, 1955

INVENTOR
Walter Scharfenberg
by:
Michael S. Striker
agt.

United States Patent Office 2,751,089
Patented June 19, 1956

2,751,089

AUTOMATIC CABLE CONNECTING APPARATUS FOR RAILROAD CARS AND THE LIKE

Walter Scharfenberg, Salzgitter-Thiede, Germany

Application February 23, 1955, Serial No. 490,099

8 Claims. (Cl. 213—1.3)

The present invention relates to railroad cars or the like which, instead of having individual generators on each car for independently providing electricity for each car, have cable connectors which are interconnected for conducting electricity from one car to the next when the cars are coupled to each other and which are disengaged when the cars are uncoupled.

With cable connectors of this type there have been difficulties up to the present time in providing automatic connection of the cable connectors when a pair of cars are coupled together, because it is important that the connection between the cable connectors be made within a certain time period and at a certain rate with respect to the time and rate of connection between the cars at the couplings thereof.

Thus, it is an object of the present invention to provide a means for accurately controlling the movement of the cable connectors into engagement with each other in dependence on the movement of the couplings of a pair of cars into engagement with each other.

Also, it is an object of the present invention to provide an automatic means for moving cable connectors between operative and inoperative positions in response to movement of a pair of couplings into their engaged and disengaged positions, respectively.

Furthermore, it is an object of the present invention to provide a structure capable of accomplishing the above objects and at the same time being made up of simple and ruggedly constructed parts which are very reliable in operation.

With the above objects in view the present invention mainly consists of an apparatus for use with railroad cars and the like and including a coupling means adapted to be mounted on a railroad car for coupling the same to another car, this coupling means including an operating member. A support means supports the operating member of the coupling means for movement between a first position where the coupling means is engaged and a second position where the coupling means is disengaged. A cable connector is carried by the support means for movement between an operative position and an inoperative position. A movement transmitting means is carried by the support means and engages the connector for moving the latter between its operative and inoperative positions. A cam means operatively engages the operating member of the coupling means to be moved thereby and operatively engages the movement transmitting means for actuating the latter to move the cable connector between its operative and inoperative positions when the operating member moves between the first and second position thereof, respectively.

Figure 2:
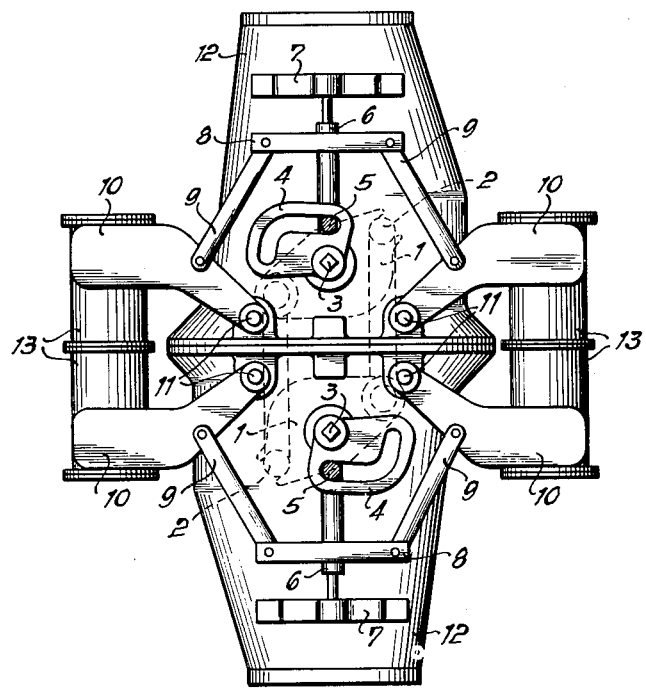

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a top plan view of a coupling provided with the structure of the invention for moving a pair of cable connectors between their operative and inoperative positions, the connectors being shown in their inoperative position in Fig. 1; and Fig. 2 shows a pair of the couplings of Fig. 1 in a top plan view in their interengaged position with the cable connectors in their operative position.

The drawings illustrate only enough structure to afford a complete understanding of the invention. The construction of the couplings themselves do not per se form a part of the present invention. The couplings shown in the drawings have the construction of the couplings which are disclosed in detail in German Patent No. 660,833 issued on June 3, 1938, and the disclosure of this patent with regard to the couplings per se is hereby incorporated into this application.

It is sufficient for the purpose of understanding the present invention to know that the coupling of Fig. 1 is adapted to be mounted on a railroad car. This coupling includes a support means part of which is formed by the housing 12. This support means supports an operating member 3 of the coupling for movement between a pair of positions when the coupling is engaged and disengaged, respectively. Thus, the shaft 3 extends through and beyond the support 12 which supports the shaft 3 for turning movement about its axis, and within the housing the shaft 3 is fixed to a hook receiving member 1 which turns with the shaft 3. A hook 2 is pivotally connected to the hook receiving member 1. As is fully disclosed in the above-cited German patent, and as is shown in dotted lines in Fig. 2, when the couplings of a pair of cars are engaged the hook 2 of each coupling is operatively received by the hook receiving member of the other coupling in a fully automatic manner when the couplings are moved into engagement with each other. Thus, the shaft 3 turns from the disengaged position of Fig. 1 in a counterclockwise direction through somewhat less than 90° to the engaged position shown at the lower coupling of Fig. 2.

As is pointed out in the above-cited German patent, the shaft 3 is formed with bores which enable the shaft 3 to act as a valve for various fluid lines such as steam and compressed air lines, these valves being automatically placed in their open position when the couplings are engaged and in their closed position when the couplings are disengaged.

In addition to performing the functions of a plurality of valves and of an operating member for the coupling, the shaft 3 serves to move the cable connectors 13 between their operative and inoperative positions. As will be apparent from a comparison of Figs. 1 and 2, the cable connectors turn through an angle far smaller than that through which the shaft 3 turns during movement of the cable connectors to their operative position upon movement of the couplings to their engaging positions, so that it is important to carefully regulate the rate and timing of the movement of the cable connectors with respect to the movement of the couplings, and it is the structure for regulating the movement of the cable connectors with respect to the movement of the couplings which forms the present invention.

The connectors 13 may have the construction of any conventional cable connectors. Thus, for example, a female connector may be provided with any number of sockets to respectively receive the prongs of a corresponding male cable connector, and of course the live leads are always connected to the female connectors for transmitting the current therefrom to the male connectors.

The connectors 13 are illustrated diagrammatically in the drawings since the construction of the cable connectors per se form no part of the present invention.

Each connector 13 is carried by a lever 10 which is pivoted at its end distant from connector 13 to the support means 12, a pivot pin 11, for example, being carried by the support means and extending through an opening of each lever 10 to provide the pivotal connection thereof to the support means. As is apparent from Fig. 1, the connectors 13 and levers 10 are symmetrically arranged on the support means 12. The levers 10 form a mounting means for mounting the connectors 13 on the support means 12 for movement between the inoperative position of the connectors 13 shown in Fig. 1 and the operative position thereof shown in Fig. 2.

A movement transmitting means is provided to move the levers 10, and this movement transmitting means includes a link 9 pivotally connected at one end to each lever 10. Each link 9 is pivotally connected at its opposite end to a free end portion of a cross piece 8. As is evident from Fig. 1 the cross piece 8 and links 9 are also symmetrically arranged, the pair of links 9 respectively being connected to the ends of cross piece 8 and extending therefrom respectively into engagement with the pair of levers 10 shown in Fig. 1.

The cross piece 8 is fixed to and extends laterally across an elongated bar 6 which is slidably supported for reciprocating movement by a bearing block 7 fixed to and forming part of the support means 12. This bar 6 has a pin 5 fixed thereto and extending into a camming slot of a cam 4. The elements 5, 6, 8 and 9 form the movement transmitting means for moving the mounting means 10 to locate the cable connectors in their operative or inoperative position.

The cam 4 is fixed to the shaft 3 for turning movement therewith and is provided with a camming slot into which the pin 5 extends, this camming slot being of such a curvature that the connectors 13 will be moved from the position of Fig. 1 to that of Fig. 2 when the shaft 3 and cam 4 turn from the disengaged position of the coupling shown in Fig. 1 to its engaged position shown in Fig. 2.

Fig. 2 shows above the coupling of Fig. 1, as viewed in Fig. 2, a second coupling of the next car in operative engagement with the coupling of Fig. 1, the connectors 13 of one coupling being shown in Fig. 2 in operative engagement with the cable connectors 13 of the other coupling, respectively.

It will be noted that because cam 4 is provided with a camming slot it is capable of pulling as well as pushing the pin 5. Moreover, the shape of the cam slot is such that the cable connectors 13 are turned through a much smaller angle than the shaft 3 in such a way that the connectors are not located in their operative position prematurely or too late.

It will be understood that each of the elements described above, or two or more together, may also find a useful application in other types of cable connecting apparatus differing from the types described above.

While the invention has been illustrated and described as embodied in automatic cable connecting apparatus for railroad cars, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use with railroad cars and the like, in combination, coupling means adapted to be mounted on a railroad car for coupling the same to another car, said coupling means including an operating member; support means supporting said operating member of said coupling means for movement between a first position where the coupling means is engaged and a second position where the coupling means is disengaged; a cable connector carried by said support means for movement between an operative position and an inoperative position; movement transmitting means carried by said support means and engaging said connector for moving the latter between said operative and inoperative positions thereof; and cam means operatively engaging said operating member of said coupling means to be moved thereby and operatively engaging said movement transmitting means for actuating the latter to move said cable connector between said operative and inoperative positions thereof when said operating member moves between said first and second positions thereof, respectively.

2. For use with railroad cars and the like, in combination, coupling means adapted to be mounted on a railroad car for coupling the same to another car, said coupling means including an operating member; support means supporting said operating member of said coupling means for movement between a first position where the coupling means is engaged and a second position where the coupling means is disengaged; a cable connector carried by said support means for movement between an operative position and an inoperative position; movement transmitting means carried by said support means and engaging said connector for moving the latter between said operative and inoperative positions thereof; and cam means connected to said operating member of said coupling means for movement therewith and operatively engaging said movement transmitting means for actuating the latter to move said cable connector between said operative and inoperative positions thereof when said operating member moves between said first and second positions thereof, respectively.

3. For use with railroad cars and the like, in combination, coupling means adapted to be mounted on a railroad car for coupling the same to another car, said coupling means including an operating member; support means supporting said operating member of said coupling means for turning movement between a first position where the coupling means is engaged and a second position where the coupling means is disengaged; a cable connector carried by said support means for movement between an operative position and an inoperative position; movement transmitting means carried by said support means and engaging said connector for moving the latter between said operative and inoperative positions thereof; and cam means connected to said operating member of said coupling means for turning movement therewith and operatively engaging said movement transmitting means for actuating the latter to move said cable connector between said operative and inoperative positions thereof when said operating member moves between said first and second positions thereof, respectively.

4. For use with railroad cars and the like, in combination, coupling means adapted to be mounted on a railroad car for coupling the same to another car, said coupling means including an operating member; support means supporting said operating member of said coupling means for movement between a first position where the coupling means is engaged and a second position where the coupling means is disengaged; a cable connector carried by said support means for movement between an operative position and an inoperative position; movement transmitting means carried by said support means and engaging said connector for moving the latter between said operative and inoperative positions thereof, said movement transmitting means including a bar carried by said support means for shifting movement in opposite directions when said movement transmitting means moves said cable connector between said positions thereof, respectively; and cam means connected to said operating member of said coupling means for movement therewith and operatively engaging said bar for shifting the latter in said opposite directions to actuate said movement transmitting means to move said cable connector between said operative and inoperative positions thereof when said operating member moves between said first and second positions thereof, respectively.

5. For use with railroad cars and the like, in combination, coupling means adapted to be mounted on a railroad car for coupling the same to another car, said coupling means including an operating member; support means supporting said operating member of said coupling means for movement between a first position where the coupling means is engaged and a second position where the coupling means is disengaged; a cable connector carried by said support means for movement between an operative position and an inoperative position; movement transmitting means carried by said support means and engaging said connector for moving the latter between said operative and inoperative positions thereof, said movement transmitting means including a bar carried by said support means for shifting movement in opposite directions when said movement transmitting means moves said cable connector between said positions thereof, respectively, a cross piece fixed to and extending laterally from said bar for movement therewith, and a link connected to said cross piece and operatively connected to said cable connector; and cam means connected to said operating member of said coupling means for movement therewith and operatively engaging said bar for shifting the latter in said opposite directions to actuate said movement transmitting means to move said cable connector between said operative and inoperative positions thereof when said operating member moves between said first and second positions thereof, respectively.

6. For use with railroad cars and the like, in combination, coupling means adapted to be mounted on a railroad car for coupling the same to another car, said coupling means including an operating shaft; support means supporting said shaft for turning movement about its axis between a first position where the coupling means is engaged and a second position where the coupling means is disengaged; a cable connector; mounting means carrying said connector and mounting the same on said support means for movement between an operative position and an inoperative position; a cam fixed to said shaft for turning movement therewith and being formed with a camming slot of predetermined curvature; a pin located in said slot; a bar fixed to said pin and carried by said support means for shifting movement upon turning of said shaft and cam; a cross piece fixed to and extending laterally from said bar; and a link pivotally connected at one end to said cross piece and at an opposite end to said mounting means so that upon turning of said shaft between said first and second positions thereof said connector will be moved between said operative and inoperative positions thereof, respectively.

7. For use with railroad cars and the like, in combination, coupling means adapted to be mounted on a railroad car for coupling the same to another car, said coupling means including an operating shaft; support means supporting said shaft for turning movement about its axis between a first position where the coupling means is engaged and a second position where the coupling means is disengaged; a pair of cable connectors symmetrically located adjacent opposite parts of said support means; mounting means carrying said connectors and mounting the same on said support means for movement between an operative and inoperative position; a cam fixed to said shaft for turning movement therewith and being formed with a camming slot of predetermined curvature; a pin located in said slot; a bar fixed to said pin and carried by said support means for shifting movement upon turning of said shaft and cam; a cross piece fixed to and extending laterally from and across said bar; and a pair of links respectively connected pivotally to said cross piece adjacent opposite end portions thereof and to said mounting means for actuating the latter upon turning of said shaft between said first and second positions to move said cable connectors between said operative and inoperative positions, respectively.

8. For use with railroad cars and the like, in combination, a pair of coupling means adapted to be mounted on a pair of railroad cars for releasably coupling the same to each other, each of said coupling means including an operating shaft; a pair of support means respectively supporting said shafts for turning movement about their axes, respectively, between a first position where the pair of coupling means are interengaged with each other and a second position where the pair of coupling means are disengaged; a pair of cable connectors symmetrically located adjacent opposite parts of each of said support means; mounting means carrying said cable connectors and mounting the same on said pair of support means for movement between an operative position where one pair of connectors are respectively in engagement with the other pair of connectors and in inoperative position where said pairs of connectors are out of engagement with each other; a cam fixed to each of said shafts for turning movement therewith and being formed with a camming slot of predetermined curvature; a pin located in said slot, a bar fixed to said pin and carried by each of said support means for shifting movement upon turning of said shafts and cams; a pair of cross pieces respectively fixed to and extending across said bars; and a pair of links respectively connected pivotally to each of said cross pieces adjacent opposite end portions thereof, said pairs of links respectively being connected to said mounting means for actuating the latter upon turning of said shafts between said first and second positions to move said cable connectors between said operative and inoperative positions, respectively.

No references cited.